(12) United States Patent
Steinhaus et al.

(10) Patent No.: US 8,783,585 B2
(45) Date of Patent: Jul. 22, 2014

(54) METHODS AND SYSTEMS FOR MIXING REACTOR FEED

(75) Inventors: Benjamin Campbell Steinhaus, Missouri City, TX (US); Shashishekara Sitharamarao Talya, Houston, TX (US)

(73) Assignee: General Electric Company, Schenectady, NY (US)

( * ) Notice: Subject to any disclaimer, the term of this patent is extended or adjusted under 35 U.S.C. 154(b) by 385 days.

(21) Appl. No.: 12/469,368

(22) Filed: May 20, 2009

(65) Prior Publication Data

US 2010/0294858 A1 Nov. 25, 2010

(51) Int. Cl.
| | | |
|---|---|---|
| *F23D 11/16* | (2006.01) | |
| *C10J 3/50* | (2006.01) | |
| *F23D 1/00* | (2006.01) | |
| *C10J 3/84* | (2006.01) | |
| *C10K 1/10* | (2006.01) | |

(52) U.S. Cl.
CPC ....... *C10J 3/506* (2013.01); *F23C 2900/07021* (2013.01); *C10J 2200/09* (2013.01); *F23D 1/00* (2013.01); *F23R 2900/00002* (2013.01); *F23D 1/005* (2013.01); *Y02E 20/18* (2013.01); *C10J 2200/152* (2013.01); *C10J 3/845* (2013.01); *C10K 1/101* (2013.01); *C10J 3/84* (2013.01)
USPC ......... 239/419; 239/422; 239/427.5; 239/429

(58) Field of Classification Search
USPC ................ 239/88, 398–434.5, 520–523, 419; 60/776
See application file for complete search history.

(56) References Cited

U.S. PATENT DOCUMENTS

| | | | | |
|---|---|---|---|---|
| 515,837 | A | * | 3/1894 | Mullaney ....................... 239/425 |
| 1,098,884 | A | * | 6/1914 | Comstock ..................... 239/194 |
| 2,204,170 | A | * | 6/1940 | Zwilling .................. 239/214.11 |
| 2,643,916 | A | * | 6/1953 | White et al. ............... 239/416.5 |
| 3,346,412 | A | * | 10/1967 | Siegenthaler et al. ........ 427/236 |
| 3,556,497 | A | * | 1/1971 | Grenfell ..................... 239/132.3 |

(Continued)

FOREIGN PATENT DOCUMENTS

| | | |
|---|---|---|
| GB | 30103 A | 0/1898 |
| GB | 2050592 A | 1/1981 |

(Continued)

OTHER PUBLICATIONS

WO Search Report issued in connection with corresponding WO Patent Application No. US10/28608 filed on Mar. 25, 2010.

*Primary Examiner* — Len Tran
*Assistant Examiner* — Viet Le
(74) *Attorney, Agent, or Firm* — Armstrong Teasdale LLP (57) ABSTRACT

Methods and systems for a feed injector are provided. The feed injector includes a first annular channel defined in the feed injector. The first annular channel includes a first end, an arcuate portion and a second end. The arcuate portion is between the first and second ends, and the first annular channel is oriented substantially concentrically about a longitudinal axis of the feed injector. The arcuate portion is oriented to discharge a fluid flowing through the first annular channel radially outward with respect to the longitudinal axis. The feed injector also includes a second annular channel including a first end, an arcuate portion, and a second end, wherein the arcuate portion is between the first and second ends. The second annular channel circumscribes the first annular channel, and the second annular channel first end is positioned radially outward and downstream from the first annular channel first end.

17 Claims, 3 Drawing Sheets

(56) References Cited

U.S. PATENT DOCUMENTS

| | | | | |
|---|---|---|---|---|
| 3,644,076 | A * | 2/1972 | Bagge | 431/284 |
| 3,748,082 | A * | 7/1973 | Ivernel | 431/8 |
| 3,848,807 | A * | 11/1974 | Partida | 239/290 |
| 4,002,297 | A * | 1/1977 | Pillard | 239/429 |
| 4,337,618 | A * | 7/1982 | Hughes et al. | 60/39.55 |
| 4,384,846 | A * | 5/1983 | Waldhofer | 431/284 |
| 4,602,571 | A * | 7/1986 | Chadshay | 110/264 |
| 4,634,054 | A * | 1/1987 | Grusha | 239/423 |
| 5,145,359 | A * | 9/1992 | Ancona et al. | 431/184 |
| 5,217,363 | A * | 6/1993 | Brais et al. | 431/186 |
| 5,273,212 | A * | 12/1993 | Gerhardus et al. | 239/132.3 |
| 5,408,830 | A * | 4/1995 | Lovett | 60/737 |
| 5,567,141 | A * | 10/1996 | Joshi et al. | 431/8 |
| 5,966,937 | A * | 10/1999 | Graves | 60/748 |
| 6,174,161 | B1 * | 1/2001 | Slavejkov et al. | 431/159 |
| 6,378,787 | B1 * | 4/2002 | Buchi et al. | 239/406 |
| 6,892,654 | B2 * | 5/2005 | Whittaker et al. | 110/260 |
| 7,416,404 | B2 | 8/2008 | Chan | |
| 2001/0030247 | A1 * | 10/2001 | Chung et al. | 239/398 |
| 2002/0086257 | A1 * | 7/2002 | Primdahl | 431/187 |
| 2004/0069870 | A1 * | 4/2004 | Lacchia | 239/418 |
| 2005/0001061 | A1 * | 1/2005 | Mauchle et al. | 239/423 |
| 2005/0178856 | A1 * | 8/2005 | Holtzapple et al. | 239/418 |
| 2005/0224605 | A1 * | 10/2005 | Dingle | 239/533.2 |
| 2006/0214027 | A1 * | 9/2006 | Micheli | 239/418 |
| 2007/0063068 | A1 * | 3/2007 | Seitz et al. | 239/223 |
| 2007/0158451 | A1 * | 7/2007 | Mao et al. | 239/13 |
| 2007/0164131 | A1 * | 7/2007 | Kleba et al. | 239/433 |
| 2007/0246575 | A1 * | 10/2007 | Cairo et al. | 239/589 |
| 2009/0277364 | A1 * | 11/2009 | Donais et al. | 110/263 |
| 2010/0018445 | A1 | 1/2010 | Li | |
| 2010/0294858 | A1 * | 11/2010 | Steinhaus et al. | 239/418 |
| 2010/0308135 | A1 * | 12/2010 | Yamamoto et al. | 239/402 |

FOREIGN PATENT DOCUMENTS

| | | |
|---|---|---|
| GB | 2094464 A | 9/1982 |
| WO | 2009/009945 A1 | 1/2009 |
| WO | 2009/134530 A2 | 11/2009 |

* cited by examiner

METHODS AND SYSTEMS FOR MIXING REACTOR FEED

BACKGROUND OF THE INVENTION

This invention relates generally to gasification systems, and more specifically to methods and systems for injecting feed into a gasifier.

At least some known gasifiers convert a mixture of fuel, air or oxygen, liquid water and/or steam, and/or slag into an output of partially oxidized gas, sometimes referred to as "syngas." In an integrated gasification combined-cycle (IGCC) power generation system, syngas is supplied to the combustor of a gas turbine engine, which powers a generator that supplies electrical power to a power grid. Exhaust from the gas turbine engines may be supplied to a heat recovery steam generator that generates steam for driving a steam turbine. Power generated by the steam turbine also drives an electrical generator that provides electrical power to the power grid.

The fuel, air or oxygen, liquid water and/or steam, and/or slag additive(s) are injected into the gasifier from separate sources through a feed injector that couples the feed sources to a feed nozzle. The feed sources traverse the feed injector separately and are mixed together in a reaction zone downstream from the nozzle. For the reaction to complete in the short time the mixture is in residence in the reaction zone, intimate mixing of the feed components is essential. Such mixing is facilitated by disposing or atomizing, the feed components in a fine spray. Generally, a finer spray, or smaller droplet size, of the feed components yields a more complete combustion of the feed components. At least some know gasification feed injectors reduce one or more flow paths that the feed components flow through to achieve a smaller droplet size. However, such feed injector flow paths are constrained by the size of the feed component particles and a reduction of droplet size may be limited thereby.

BRIEF DESCRIPTION OF THE INVENTION

In one embodiment, a feed injector for use in a gasifier is provided. The feed injector includes a first annular channel defined in the feed injector, wherein the first annular channel includes a first end, an arcuate portion and a second end. The arcuate portion is between the first and second ends, and the first annular channel is oriented substantially concentrically about a longitudinal axis of the feed injector. The arcuate portion is oriented to discharge a fluid flowing through the first annular channel radially outward with respect to the longitudinal axis. The feed injector also includes a second annular channel that includes a first end, an arcuate portion, and a second end. The arcuate portion is between the first and second ends, and the second annular channel circumscribes the first annular channel. The second annular channel first end is positioned radially outward and downstream from the first annular channel first end.

In another embodiment, a gasifier system is provided. The system includes a pressure vessel for use in at least partially oxidizing a carbonaceous fuel and a feed injector configured to inject a carbonaceous fuel into the pressure vessel. The feed injector includes a first annular channel defined in the feed injector, wherein the first annular channel includes a first end, an arcuate portion and a second end. The arcuate portion is between the first and second ends, and the first annular channel is oriented substantially concentrically about a longitudinal axis of the feed injector. The arcuate portion is oriented to discharge a fluid flowing through the first annular channel radially outward with respect to the longitudinal axis. The feed injector also includes a second annular channel that includes a first end, an arcuate portion, and a second end. The arcuate portion is between the first and second ends, and the second annular channel circumscribes the first annular channel. The second annular channel first end is positioned radially outward and downstream from the first annular channel first end.

In yet another embodiment, a bayonet assembly for use in a gasifier feed injector is provided. The bayonet assembly includes a bayonet insert that includes a first end, an arcuate portion, and a second end. The arcuate portion extends from the first end towards the second end, and the bayonet insert extends substantially concentrically about a longitudinal axis of the feed injector. The bayonet assembly also includes a first bayonet that includes a first end, an arcuate portion, and a second end. The first bayonet arcuate portion extends from the first end towards the second end, and the first bayonet circumscribes the bayonet insert. The bayonet assembly also includes a second bayonet that includes a first end, an arcuate portion, and a second end. The second bayonet arcuate portion extends from the first end towards the second end, and the second bayonet circumscribes the first bayonet. The second bayonet first end is radially outward and downstream from the first bayonet first end.

DETAILED DESCRIPTION OF THE INVENTION

Figure 1:
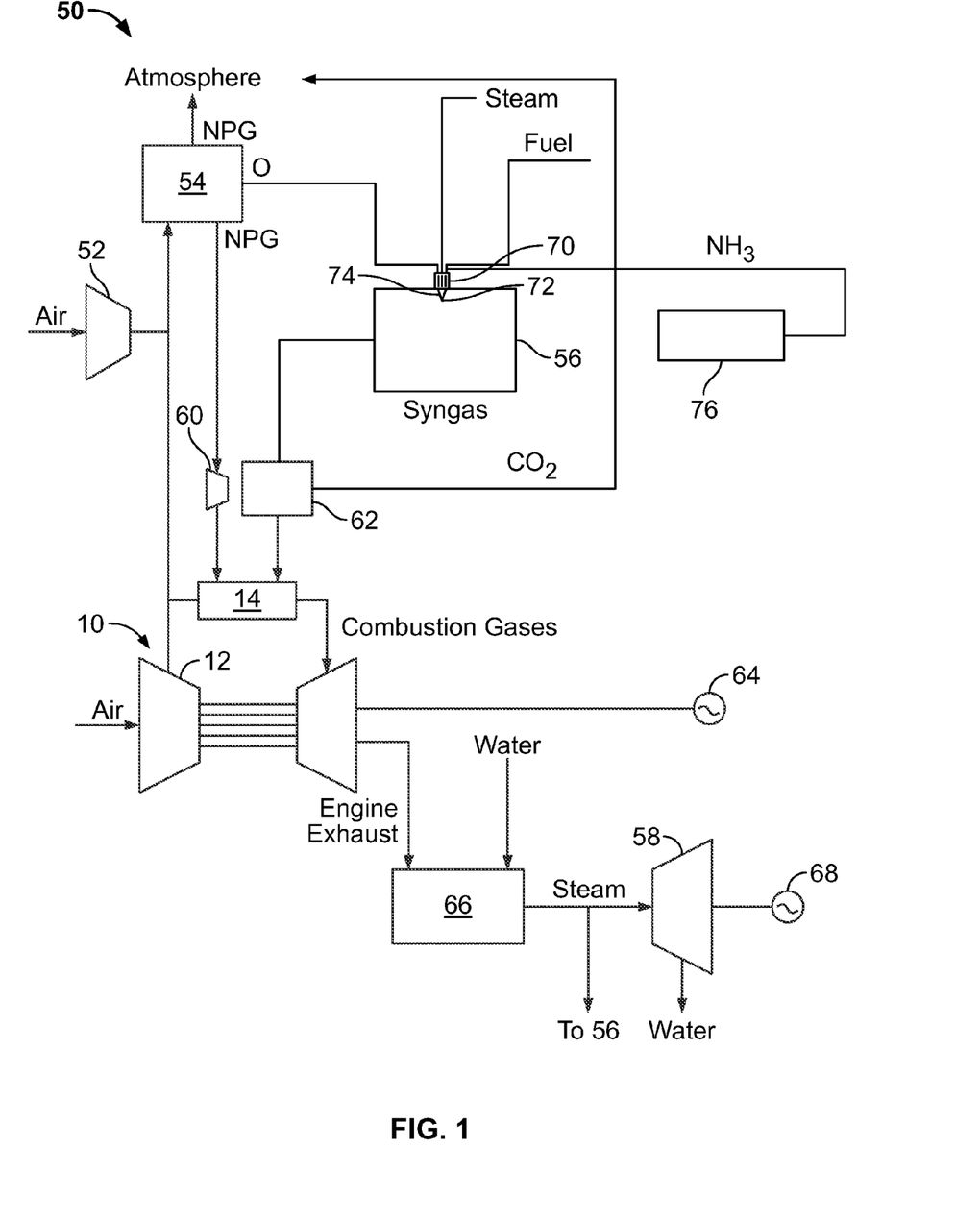
FIG. 1 is a schematic diagram of an exemplary known integrated gasification combined-cycle (IGCC) power generation system.

FIG. 1 is a schematic diagram of an exemplary integrated gasification combined-cycle (IGCC) power generation system 50. Generally, IGCC system 50 includes a main air compressor 52, an air separation unit 54 coupled in flow communication to compressor 52, a gasifier 56 coupled in flow communication to air separation unit 54, a gas turbine engine 10 coupled in flow communication to gasifier 56, and a steam turbine 58. In operation, compressor 52 compresses ambient air that is channeled to air separation unit 54. In some embodiments, in addition to or in the alternative to compressor 52, compressed air from gas turbine engine compressor 12 is supplied to air separation unit 54. Air separation unit 54 uses the compressed air to generate oxygen for use by gasifier 56. More specifically, air separation unit 54 separates the compressed air into separate flows of oxygen and a gas by-product, sometimes referred to as a "process gas."

The process gas generated by air separation unit 54 includes nitrogen and will be referred to herein as "nitrogen process gas." The nitrogen process gas may also include other gases such as, but not limited to, oxygen and/or argon. For example, in some embodiments, the nitrogen process gas includes between about 95% and about 100% nitrogen. The oxygen flow is channeled to gasifier 56 for use in generating partially combusted gases, referred to herein as "syngas" for use by gas turbine engine 10 as fuel, as described below in more detail. In some known IGCC systems 50, at least some of the nitrogen process gas flow, a by-product of air separation unit 54, is vented to the atmosphere. Moreover, in some known IGCC systems 50, some of the nitrogen process gas flow is injected into a combustion zone (not shown) within gas turbine engine combustor 14 to facilitate controlling emissions of engine 10, and more specifically to facilitate reducing the combustion temperature and reducing nitrous oxide emissions from engine 10. IGCC system 50 may include a compressor 60 for compressing the nitrogen process gas flow before being injected into the combustion zone.

Gasifier 56 converts a mixture of fuel, the oxygen supplied by air separation unit 54, liquid water and/or steam, and/or slag additive into an output of syngas for use by gas turbine engine 10 as fuel. Although gasifier 56 may use any fuel, in some known IGCC systems 50, gasifier 56 uses coal, petroleum coke, residual oil, oil emulsions, tar sands, and/or other similar fuels. In some known IGCC systems 50, the syngas generated by gasifier 56 includes carbon dioxide. Syngas generated by gasifier 56 may be cleaned in a clean-up device 62 before being channeled to gas turbine engine combustor 14 for combustion thereof. Carbon dioxide may be separated from the syngas during clean-up and, in some known IGCC systems 50, vented to the atmosphere. The power output from gas turbine engine 10 drives a generator 64 that supplies electrical power to a power grid (not shown). Exhaust gas from gas turbine engine 10 is supplied to a heat recovery steam generator 66 that generates steam for driving steam turbine 58. Power generated by steam turbine 58 drives an electrical generator 68 that provides electrical power to the power grid. In some known IGCC systems 50, steam from heat recovery steam generator 66 is supplied to gasifier 56 for generating the syngas. In other known IGCC systems 50, thermal energy produced from the generation of syngas is used to generate additional steam for driving steam turbine 58.

Figure 2:
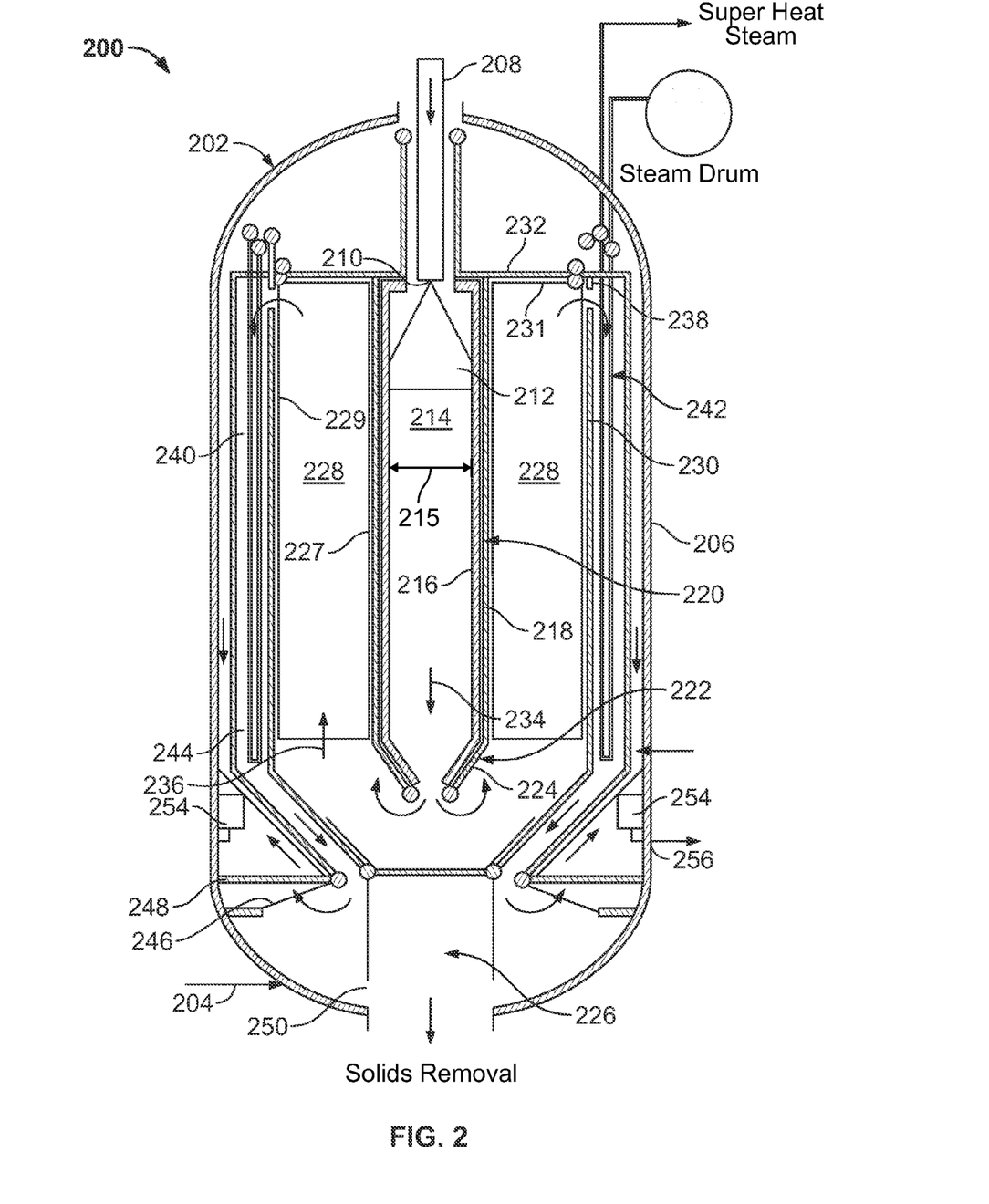
FIG. 2 is a schematic view of an exemplary gasifier that may be used with the system shown in FIG. 1.

FIG. 2 is a schematic view of an exemplary gasifier 200 that may be used with system 50 (shown in FIG. 1). In the exemplary embodiment, gasifier 200 includes an upper shell 202, a lower shell 204, and a substantially cylindrical vessel body 206 extending therebetween. A feed injector 208 penetrates upper shell 202 or vessel body 206 to enable a flow of fuel to be discharged into gasifier 200. The fuel is channeled through one or more passages defined in feed injector 208 and is discharged from a nozzle 210 in a predetermined spray pattern 212 into a combustion zone 214 defined in gasifier 200. The fuel may be mixed with other substances prior to entering nozzle 210, and/or may be mixed with other substances while being discharged from nozzle 210. For example, the fuel may be mixed with fines recovered from a process of system 50 to facilitate increasing the overall conversion of the fuel, and/or may be mixed with a slag additive to facilitate improving the melting behavior of any fuel ash prior to entering nozzle 210. Moreover, the fuel may be mixed with an oxidant, such as air or oxygen at nozzle 210 or downstream of nozzle 210.

In the exemplary embodiment, combustion zone 214 is a vertically-oriented, substantially cylindrical, space that is substantially co-aligned and in serial flow communication with nozzle 210. An outer periphery 215 of combustion zone 214 is defined by a refractory wall 216 that includes a structural substrate, such as an Incoloy pipe 218 and a refractory coating 220 that includes properties that resist the effects of the relatively high temperatures and high pressures contained within combustion zone 214. An outlet end 222 of refractory wall 216 includes a convergent nozzle 224 that is oriented and designed to facilitate maintaining a predetermined back pressure in combustion zone 214, while permitting products of combustion and syngas generated in combustion zone 214 to exit combustion zone 214. The products of combustion include gaseous byproducts, a slag formed generally on refractory coating 220 and fine particulates carried in suspension with the gaseous byproducts.

After exiting combustion zone 214, the flowable slag and solid slag are gravity fed into a solids quench pool 226 contained in lower shell 204. Solids quench pool 226 is maintained with a level of water that quenches the flowable slag into a brittle solid material that may be broken in smaller pieces after being removed from gasifier 200. Solids quench pool 226 also traps approximately ninety percent of fine particulate exiting combustion zone 214.

In the exemplary embodiment, an annular first passage 228 at least partially surrounds combustion zone 214. First passage 228 is defined by refractory wall 216 at an inner periphery 227 and by a cylindrical shell 230 that is generally coaxially aligned with combustion zone 214 at a radially outer periphery 229 of first passage 228. First passage 228 is closed at its top 231 by a top flange 232. Gaseous byproducts and the remaining ten percent of fine particulate are channeled from a downward direction 234 in combustion zone 214 to an upward direction 236 in first passage 228. The rapid redirection at outlet nozzle 224 facilitates fine particulate and slag separation from the gaseous byproducts.

The gaseous byproducts and the remaining ten percent of fine particulate are channeled upwardly through first passage 228 to a first passage outlet 238. As the gaseous byproducts are channeled through first passage 228, heat may be recovered from the gaseous byproducts and the fine particulate. The gaseous byproducts and fine particulates initially exit first passage 228 through first passage outlet 238 into a second annular passage 240 wherein the gaseous byproducts and fine particulates are then redirected downwardly. As the flow of gaseous byproducts and the fine particulates is transported through second passage 240, heat may be recovered from the flow of gaseous byproducts and the fine particulates using for example, superheat tubes 242 that remove heat from the flow of gaseous byproducts and the fine particulates and transfer the heat to steam flowing through the superheat tubes 242.

When the flow of gaseous byproducts and the fine particulates reach a bottom end 244 of second passage 240, near lower shell 204, second passage 240 converges towards solids quench pool 226. Moreover, at bottom end 244, the flow of gaseous byproducts and the fine particulates is channeled upwardly through a water spray 246 that facilitates cooling the flow of gaseous byproducts and the fine particulates. Heat removed from the flow of gaseous byproducts and the fine particulates facilitates vaporizing water spray 246 and agglomerating the fine particulates, such that the fine particulates form relatively larger ash clods that fall into lower shell 204. The flow of gaseous byproducts and the remaining fine particulates are then channeled in a reverse direction towards an underside of a perforated plate 248. Plate 248 forms an annular tray that circumscribes bottom end 244. A level of water is maintained above perforated plate 248 to facilitate the removal of additional fine particulate from the flow of gaseous byproducts. As the flow of gaseous byproducts and the remaining fine particulates percolates through the perforations in perforated plate 248, the fine particulates are entrapped in the water bath and carried downwardly through the perforations into a sump of water in lower shell 204. A gap 250 defined between a bottom of solids quench pool 226 and lower shell 204 permits the fine particulates to flow through to solids quench pool 226 wherein the fine particulates are removed from gasifier 200.

An entrainment separator 254 encircles an upper end of lower shell 204 above perforated plate 248 and above the water maintained above perforated plate 248. Entrainment separator 254 may be for example, a cyclonic or centrifugal separator that includes a tangential inlet or turning vanes that impart a swirling motion to the gaseous byproducts and the remaining fine particulates. In such embodiment, the particulates are thrown outward by centrifugal force towards the walls of the separator wherein the fine particulates coalesce and fall downwardly along a wall of separator lower shell 204. Additionally, a wire web (not shown) is used to form a mesh pad that is positioned such that any remaining fine particulates impact on the mesh pad surface, agglomerate with other particulates, and are gravity drained with the aid of a water spray towards lower shell 204. Entrainment separator 254 can be of any blade type, such as a chevron separator or an impingement separator. Special features such as hooks and pockets can be added to the sides of the blades to facilitate improving particulates and liquid droplet capture.

The flow of gaseous byproducts and any remaining fine particulates enter separator 254 wherein substantially all of the remaining entrained particulates and any liquid droplets are removed from the flow of gaseous byproducts. The flow of gaseous byproducts is then discharged from gasifier 200 through an outlet 256 for further processing.

Figure 3:
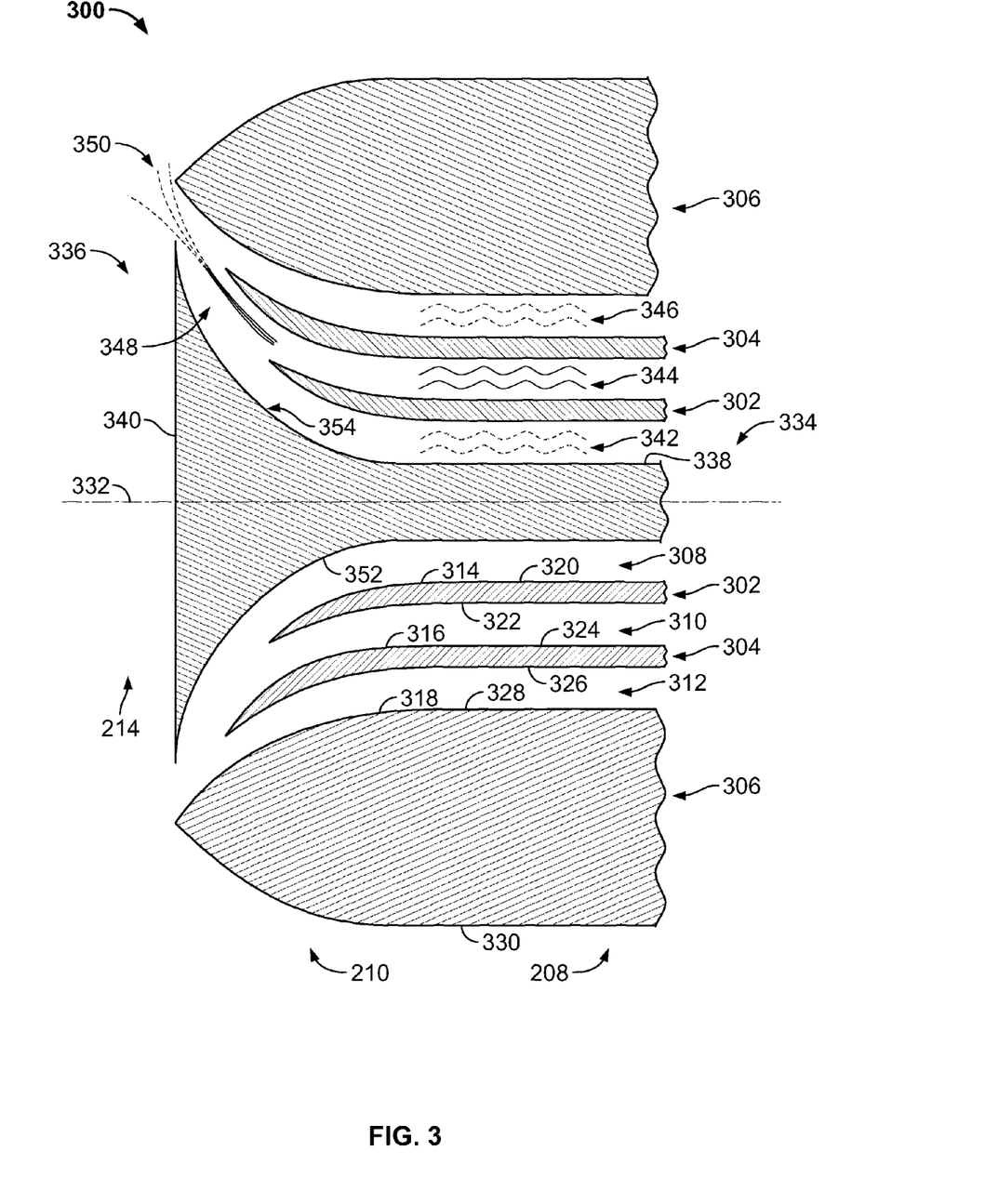
FIG. 3 is an enlarged cross-sectional view of an outlet portion of an exemplary feed injector that may be used with the gasifier shown in FIG. 2.

FIG. 3 is an enlarged cross-sectional view of nozzle 210. In the exemplary embodiment, feed injector 208 includes three substantially concentrically-arranged annular tubes 300, commonly referred to as "bayonets." Specifically, injector 208 includes an inner bayonet 302, a central bayonet 304, and an outer bayonet 306. In the exemplary embodiment, inner bayonet 302 extends from an inlet end 334 towards an outlet end 336 of nozzle 210 and is oriented substantially-axially along, and concentrically about, a centerline axis 332 of injector 208. Inner bayonet 302 includes an inner bayonet inner surface 320 and a radially opposite inner bayonet outer surface 322. Surfaces 320 and 324 are cylindrical and are concentrically-aligned with each other about centerline axis 332. Inner bayonet inner surface 320 defines an outer periphery of a substantially cylindrical inner flow path 308 that extends substantially axially along centerline axis 332 from inlet end 334 towards outlet end 336. Inner bayonet 302 terminates axially inward from outlet end 336 of nozzle 210 with an inner bayonet tip 314. Inner bayonet tip 314 is flared such that bayonet tip 314 curves radially outward from centerline axis 332. In the exemplary embodiment, tip 314 is convergent such that a width (not shown) of bayonet tip 314 decreases towards outlet end 336. More specifically, a gap (not shown) defined between inner bayonet inner surface 320 and inner bayonet outer surface 322 decreases towards outlet end 336. As such, a terminus (not shown) of inner bayonet tip 314 proximate to nozzle outlet end 336 is formed with a substantially circular edge.

In the exemplary embodiment, a divergent tip insert 338 is positioned within inner bayonet 302. More specifically, tip insert 338 is inserted into the portion of inner flow path 308 defined within inner bayonet tip 314. Divergent tip insert 338 extends from outlet end 336 towards inlet end 334 and is oriented substantially concentrically about centerline axis 332. In the exemplary embodiment, divergent tip insert 338 terminates at outlet end 336 with a flared divergent tip end 340, such that end 340 extends at least partially into combustion zone 214 (shown in FIG. 2). More specifically, divergent tip end 340 curves radially outward from centerline axis 332 adjacent nozzle outlet end 336. Moreover, divergent tip insert 338 includes a divergent tip surface 352 that curves radially outward with a diverging tip arc angle 354 measured with respect to centerline axis 332. Tip insert 338 partially obstructs inner flow path 308 such that inner flow path 308 is diverted around divergent tip insert 338. Thus, tip insert 338 creates a narrower, annular flow path 308 between inner bayonet inner surface 320 and divergent tip surface 352 adjacent to divergent tip end 340. Moreover, because of the shape of divergent tip end 340, inner flow path 308 is partially deflected radially outward in a direction that substantially conforms to the shape of divergent tip end 340 as defined by diverging tip arc angle 354.

In the exemplary embodiment, central bayonet 304 extends from inlet end 334 towards nozzle outlet end 336 such that bayonet 304 is aligned substantially axially with, and concentrically about, centerline axis 332. Central bayonet 304 includes a central bayonet inner surface 324 and a radially opposite central bayonet outer surface 326. Central bayonet inner surface 324 and central bayonet outer surface 326 are each substantially cylindrical and are concentrically-aligned with each other about centerline axis 332. Central bayonet 304 terminates axially inward from nozzle outlet end 336 with a central bayonet tip 316. Central bayonet tip 316 is substantially flared such that central bayonet tip 316 curves radially outward from centerline axis 332. In the exemplary embodiment, a width (not shown) of central bayonet tip 316 decreases adjacent to nozzle outlet end 336. More specifically, a gap (not shown) defined between central bayonet inner surface 324 and central bayonet outer surface 326 decreases as central bayonet tip 316 approaches outlet end 336. As such, proximate to nozzle outlet end 336, tip 316 forms a substantially circular edge. Central bayonet 304 has a larger diameter (not shown) than a diameter (not shown) of inner bayonet 302. Central bayonet 304 is concentrically-spaced about inner bayonet 302 such that a central flow path 310 is defined between central bayonet inner surface 324 and inner bayonet outer surface 322. As such, central flow path 310 is substantially annular and extends substantially axially along centerline axis 332 from inlet end 334 towards outlet end 336.

In the exemplary embodiment, outer bayonet 306 extends substantially axially from inlet end 334 towards nozzle outlet end 336 and is concentrically aligned about centerline axis 332. Outer bayonet 306 includes an outer bayonet inner surface 328 and a radially opposite outer bayonet outer surface 330. Outer bayonet inner surface 328 and outer bayonet outer surface 330 are each substantially cylindrical and are concentrically-aligned with each other about centerline axis 332. Outer bayonet 306 terminates at outlet end 336 of nozzle 210 with an outer bayonet tip 318 that extends at least partially into combustion zone 214. Outer bayonet tip 318 is substantially flared such that outer bayonet tip 318 curves radially outward from centerline axis 332. In the exemplary embodiment, a width (not shown) of outer bayonet tip 318 decreases adjacent to outlet end 336. More specifically, a gap (not shown) defined between outer bayonet inner surface 328 and outer bayonet outer surface 330 decreases adjacent to outlet end 336. As such, outer bayonet tip 318 forms a substantially circular edge at nozzle end 336. Outer bayonet 306 has a larger diameter (not shown) than a diameter (not shown) of central bayonet 304. Moreover, outer bayonet 306 is concentrically spaced about central bayonet 304 such that an outer flow path 312 is defined between outer bayonet inner surface 328 and central bayonet outer surface 326. As such, outer flow path 312 is substantially annular and extends substantially axially along centerline axis 332 from inlet end 334 towards outlet end 336.

In the exemplary embodiment, inner, central, and outer bayonet tips 314, 316, and 318 (respectively) curve radially outward from centerline axis 332 along an arc angle (not shown) that is approximately equal to divergent tip arc angle 354. The arc angle at each of inner, central, and outer bayonet tips 314, 316, and 318 (respectively), is tangent to each other.

Each arc angle is no less than 0°, and no more than about 40°. In an alternative embodiment, at least one arc angle of inner, central, and/or outer bayonet tip 314, 316, and/or 318 (respectively) is less than 0° or greater than about 40°. In another alternative embodiment, at least one arc angle (not shown) of inner, central, and/or outer bayonet tip 314, 316, and/or 318 (respectively) is different than divergent tip arc angle 354. In yet another alternative embodiment, at least one arc angle of inner, central, and/or outer bayonet tip 314, 316, and/or 318 (respectively) is different from at least one arc angle of the other tips, 314, 316, and/or 318 (respectively). In the exemplary embodiment, inner bayonet tip 314 is a distance (not shown) inward, or upstream, from central bayonet tip 316. Inner flow path 308 continues towards outlet end 336, past the terminus of inner bayonet tip 314, and converges with central flow path 310. In the exemplary embodiment, central bayonet tip 316 terminates an axial distance (not shown) inward, or upstream, from the terminus of outer bayonet tip 318. Inner and central flow paths 308 and 310 (respectively) each continue towards outlet end 336 past the terminus of central bayonet tip 316 and converge with outer flow path 312. In the exemplary embodiment, outer bayonet tip 318 terminates at the same axial position as a terminus (not shown) of divergent tip end 340.

In the exemplary embodiment, inner bayonet 302 channels a first oxidation fluid 342 through inner flow path 308. In one embodiment, first oxidation fluid 342 includes recycled gaseous carbon dioxide. In another alternative embodiment, first oxidation fluid 342 includes gaseous oxygen. In yet another embodiment, first oxidation fluid 342 includes at least one fluid including, but not limited to, air, oxygen, oxygen enriched air, steam, carbon dioxide, and/or nitrogen. In the exemplary embodiment, central bayonet 304 transports a carbonaceous fuel 344 through central flow path 310. In one embodiment, carbonaceous fuel 344 includes water or steam mixed with coal particles. In another alternative embodiment, carbonaceous fuel 344 includes any other carbonaceous particles entrained in a liquid, slurry, and/or gas. In the exemplary embodiment, outer bayonet 306 channels a second oxidation fluid 346 through outer flow path 312. In a further embodiment, second oxidation fluid 346 includes gaseous oxygen. In an alternative embodiment, second oxidation fluid 346 includes recycled gaseous carbon dioxide. In another embodiment, second oxidation fluid 346 includes at least one fluid including, but not limited to, air, oxygen, oxygen enriched air, steam, carbon dioxide, and/or nitrogen.

During operation, first oxidation fluid 342 is directed through inner flow path 308 towards outlet end 336, and carbonaceous fuel 344 is directed through central flow path 310 towards outlet end 336. Second oxidation fluid 346 is directed through outer flow path 312 towards outlet end 336. As first oxidation fluid 342 and carbonaceous fuel 344 reach the terminus of inner bayonet tip 314, inner flow path 308 converges with central flow path 310, and first oxidation fluid 342 impacts carbonaceous fuel 344 at an oblique angle (not shown). The curvature of divergent tip surface 352, inner bayonet tip 314, and central bayonet tip 316 facilitate first oxidation fluid 342 shearing carbonaceous fuel 344 into a thin fuel film 348. More specifically, thin fuel film 348 is substantially stable, i.e., thin fuel film 348 is facilitated to be formed with a substantially uniform thickness. Moreover, first oxidation fluid 342 facilitates substantially removing flow pulsations within carbonaceous fuel 344 that may be introduced upstream of nozzle 210. As the thin fuel film 348 reaches the terminus of central bayonet tip 316, second oxidation fluid 346 impacts the thin fuel film 348 at a second oblique angle (not shown). The curvature of divergent tip surface 352, central bayonet tip 316, and outer bayonet tip 318 facilitate second oxidation fluid 346 substantially atomizing thin fuel film 348 into a slurry spray 350. Moreover, first and/or second oxidation fluids 342 and/or 346 mix with each other and/or with fuel film 348 prior to exiting nozzle 210. Slurry spray 350 and first and second oxidation fluids 342 and 346, respectively, exit nozzle 210 at outlet end 336 and enter combustion zone 214. In combustion zone 214, first and second oxidation fluids 342 and 346, respectively, and slurry spray 350 self-ignite. Self-ignition of first and second oxidation fluids 342 and 346, respectively, and slurry spray 350 is enhanced by the breakup or atomization of slurry spray 350 as it exits nozzle 210. Moreover, such atomization promotes the product reaction and heat development required for the gasification process.

Moreover, the above-described nozzle 210 may be used to facilitate increasing atomization of carbonaceous fuel 344 using larger versions of feed injector 208. The benefits of the above-described nozzle 210 do not depend on a particular cross-sectional area of inner, central, and outer flow paths, 308, 310, and 312, respectively, but rather the benefits are more dependent on the shape of nozzle 210, and/or the prefilming of carbonaceous fuel 344 and hence a rate of fluid flow through flow paths 308, 310, and 312, respectively, to increase atomization, and reduce a droplet size, of carbonaceous fuel 344.

As used herein "fluid" refers to any composition that can flow such as but not limited to semi-solids, pastes, solutions, aqueous mixtures, gels, lotions, creams, dispersions, emulsions, foams, suspensions, microemulsions, gases, vapors, and other such compositions.

The above-described methods and systems facilitate injecting feed into a reactor in a cost-effective and reliable manner. The methods and systems facilitate increasing atomization of the feed and reducing feed droplet size, leading to improved carbon conversion, thereby promoting self-ignition and a more complete oxidation of the fuel. The methods and systems described herein may be used with feed injector systems of varying sizes, as the benefits described herein are a product of flow rate of the fluids within the injector flow paths, rather than the cross-sectional areas of the flow paths. Accordingly, the methods and systems facilitate the operation of a gasification system in a cost-effective and reliable manner.

Exemplary embodiments of a gasification system and a method and feed injector for mixing reactor feed are described above in detail. The method, gasifier, and feed injector are not limited to the specific embodiments described herein, but rather, components of the gasifier and/or feed injector and/or steps of the method may be utilized independently and separately from other components and/or steps described herein. For example, the feed injector may also be used in combination with other systems and methods, and is not limited to practice with only the gasifier and method as described herein. Rather, the exemplary embodiment can be implemented and utilized in connection with many other power applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A feed injector for use in a gasifier, said feed injector comprising:
a first annular channel defined in said feed injector, said first annular channel comprising a first end, an arcuate portion and a second end, said arcuate portion is between said first and second ends, said first annular channel is oriented substantially concentrically about a longitudinal axis of said feed injector such that a first arc angle is defined between said longitudinal axis and said first annular channel, said arcuate portion is oriented to discharge a fluid flowing through said first annular channel radially outward with respect to said longitudinal axis, said first annular channel further comprises an inner flow path defined therein;
a second annular channel comprising a first end, an arcuate portion, and a second end, said arcuate portion is between said first and second ends, said second annular channel circumscribes said first annular channel and a second arc angle is defined between said longitudinal axis and said second annular channel, said second annular channel first end is positioned radially outward and downstream from said first annular channel first end such that said first annular channel and said second annular channel converge into a merged annular channel that extends longitudinally downstream from said first annular channel first end;
a third annular channel comprising a first end, an arcuate portion, and a second end, said arcuate portion is between said first and second ends, said third annular channel circumscribes said second annular channel, said third annular channel first end is positioned radially outward and downstream from said second annular channel first end, such that a first fluid flow in said first annular channel and a second fluid flow in said second annular channel combine in said merged annular channel upstream of a location where said merged annular channel converges with said third annular channel first end; and
a tip insert positioned within a portion of said first annular channel such that said tip insert is positioned in a portion of said inner flow path, said tip insert comprising a divergent tip end that extends at least partially into a reaction zone, wherein said tip insert further comprises a tip surface that curves radially outward at a third arc angle with respect to said longitudinal axis, wherein the third arc angle is approximately equal to the first and second arc angles.

2. A feed injector in accordance with claim 1, wherein each of said first, second, and third arcuate portions extends from said first end towards said second end.

3. A feed injector in accordance with claim 1, wherein said feed injector is configured to discharge a first oxidation fluid, a carbonaceous fuel, and a second oxidation fluid to the reaction zone, such that at least two of the fluids are mixed prior to the fluids being discharged from said feed injector.

4. A feed injector in accordance with claim 3, wherein said first annular channel is oriented to discharge the first oxidation fluid towards the carbonaceous fuel at a first discharge angle, such that the carbonaceous fuel forms a substantially stable film.

5. A feed injector in accordance with claim 4, wherein said feed injector is configured such that the second oxidation fluid impacts the substantially stable film of carbonaceous fuel at a second discharge angle, and wherein the second oxidation fluid facilitates substantially atomizing the carbonaceous fuel.

6. A feed injector in accordance with claim 5, wherein said first discharge angle is different from said second discharge angle.

7. A feed injector in accordance with claim 1, wherein said feed injector is configured to discharge at least one of air, oxygen, oxygen enriched air, steam, carbon dioxide, and nitrogen to the reaction zone.

8. A gasifier system comprising:
a pressure vessel for use in at least partially oxidizing a carbonaceous fuel; and
a feed injector configured to inject a carbonaceous fuel into said pressure vessel, said feed injector comprises:
a first annular channel defined in said feed injector, said first annular channel comprising a first end, an arcuate portion and a second end, said arcuate portion is between said first and second ends, said first annular channel is oriented substantially concentrically about a longitudinal axis of said feed injector such that a first arc angle is defined between said longitudinal axis and said first annular channel, said arcuate portion is oriented to discharge a fluid flowing through said first annular channel radially outward with respect to said longitudinal axis, said first annular channel further comprises an inner flow path defined therein;
a second annular channel comprising a first end, an arcuate portion, and a second end, said arcuate portion is between said first and second ends, said second annular channel circumscribes said first annular channel and a second arc angle is defined between said longitudinal axis and said second annular channel, said second annular channel first end is positioned radially outward and downstream from said first annular channel first end such that said first annular channel and said second annular channel converge into a merged annular channel that extends longitudinally downstream from said first annular channel first end;
a third annular channel comprising a first end, an arcuate portion, and a second end, said arcuate portion is between said first and second ends, said third annular channel circumscribes said second annular channel, said third annular channel first end is positioned radially outward and downstream from said second annular channel first end, such that a first fluid flow in said first annular channel and a second fluid flow in said second annular channel combine in said merged annular channel upstream of a location where said merged annular channel converges with said third annular channel first end; and
a tip insert positioned within a portion of said first annular channel such that said tip insert is positioned in a portion of said inner flow path, said tip insert comprising a divergent tip end that extends at least partially into a reaction zone, wherein said tip insert further comprises a tip surface that curves radially outward at a third arc angle with respect to said longitudinal axis, wherein the third arc angle is approximately equal to the first and second arc angles.

9. A gasifier system in accordance with claim 8, wherein the feed injector is configured to discharge at least one of air, oxygen, oxygen enriched air, steam, carbon dioxide, and nitrogen to the reaction zone.

10. A gasifier system in accordance with claim 8, wherein each of said first, second, and third arcuate portions extends from said first end towards said second end.

11. A gasifier system in accordance with claim 8, wherein said feed injector is configured to discharge a first oxidation fluid, a second oxidation fluid, and a carbonaceous fuel to the reaction zone, such that at least two of the fluids are mixed prior to the fluids being discharged from said feed injector.

12. A gasifier system in accordance with claim 11, wherein said first annular channel is oriented to discharge the first oxidation fluid towards the carbonaceous fuel at a first discharge angle, such that the carbonaceous fuel forms a substantially stable film.

13. A gasifier system in accordance with claim 12, wherein said feed injector is configured such that the second oxidation fluid impacts the substantially stable film of carbonaceous fuel at a second discharge angle, and wherein the second oxidation fluid facilitates substantially atomizing the carbonaceous fuel.

14. A gasifier system in accordance with claim 13, wherein said first discharge angle is different from said second discharge angle.

15. An annular tube assembly for use in a gasifier feed injector, said annular tube assembly comprising:
   an annular tube insert comprising a divergent first end that extends at least partially into a reaction zone, an arcuate portion, and a second end, said arcuate portion extends from said first end towards said second end, said annular tube insert extends substantially concentrically about a longitudinal axis of the feed injector, wherein said tube insert further comprises a surface that curves radially outward at a first arc angle with respect to said longitudinal axis;
   a first annular tube comprising a first end, an arcuate portion, and a second end, said arcuate portion extends from said first end towards said second end, said first annular tube circumscribes said annular tube insert such that said tube insert is positioned in a portion of an inner flow path defined within said first annular tube and a second arc angle is defined between said longitudinal axis and said first annular tube; and
   a second annular tube comprising a first end, an arcuate portion, and a second end, said arcuate portion extends from said first end towards said second end, said second annular tube circumscribes said first annular tube and a third arc angle is defined between said longitudinal axis and said second annular tube, said second annular tube first end is radially outward and downstream from said first annular tube first end such that said first annular tube and said second annular tube converge into a merged annular tube that extends longitudinally downstream from said first annular tube first end, wherein the first arc angle is approximately equal to the second and third arc angles; and
   a third annular tube comprising a first end, an arcuate portion, and a second end, said arcuate portion is between said first and second ends, said third annular tube circumscribes said second annular tube, said third annular tube first end is positioned radially outward and downstream from said second annular tube first end, such that a first fluid flow in said first annular tube and a second fluid flow in said second annular tube combine in said merged annular tube upstream of a location where said merged annular tube converges with said third annular tube first end.

16. An annular tube assembly in accordance with claim 15, wherein each of said first, second, and third annular tube arcuate portions curve radially outward relative to the longitudinal axis of the feed injector.

17. An annular tube assembly in accordance with claim 16, wherein said annular tube insert first end is downstream from each of said first and second annular tube first ends.

* * * * *